(12) United States Patent
Dulaff

(10) Patent No.: US 10,240,966 B2
(45) Date of Patent: Mar. 26, 2019

(54) FLUID LEVEL DETECTION SYSTEM AND METHOD

(71) Applicant: Siemens Healthcare Diagnostics Inc., Tarrytown, NY (US)

(72) Inventor: Paul Dulaff, Columbia, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 204 days.

(21) Appl. No.: 14/904,480

(22) PCT Filed: Jun. 27, 2014

(86) PCT No.: PCT/US2014/044496
§ 371 (c)(1),
(2) Date: Jan. 12, 2016

(87) PCT Pub. No.: WO2015/006070
PCT Pub. Date: Jan. 15, 2015

(65) Prior Publication Data
US 2016/0146657 A1    May 26, 2016

Related U.S. Application Data

(60) Provisional application No. 61/845,599, filed on Jul. 12, 2013.

(51) Int. Cl.
*G01F 23/284*  (2006.01)
*G01F 23/24*  (2006.01)
*G01F 23/26*  (2006.01)

(52) U.S. Cl.
CPC .......... *G01F 23/284* (2013.01); *G01F 23/241* (2013.01); *G01F 23/261* (2013.01)

(58) Field of Classification Search
CPC ..... G01F 23/284; G01F 23/241; G01F 23/261
(Continued)

(56) References Cited

U.S. PATENT DOCUMENTS 4,736,638 A * 4/1988 Okawa .................... G01F 23/24
                                                 73/304 C
4,984,449 A * 1/1991 Caldwell ............. G01F 23/2962
                                                 73/290 V (Continued)

FOREIGN PATENT DOCUMENTS

GB   2 072 851 A    10/1981
WO   98/12513 A1    3/1998

OTHER PUBLICATIONS

Extended EP Search Report dated Feb. 27, 2017 of corresponding European Application No. 14823789.4, 4 Pages.

(Continued)

*Primary Examiner* — Son Le
*Assistant Examiner* — Marrit Eyassu

(57) ABSTRACT

A fluid level detecting system provides an input signal at a specific frequency to a sample in a container. A probe contacts the energized sample and provides a signal to a level sensing circuit. The level sensing circuit amplifies the signal from the probe and then bandpass filters, tuned to the specific frequency, the amplified signal. This filters out extraneous signals received from, for example, a cover on the container, and specifically identifies when the probe has contacted the sample fluid by comparing the filtered signal to threshold levels.

10 Claims, 8 Drawing Sheets

(58) Field of Classification Search
USPC .................................................. 73/290 V
See application file for complete search history.

(56) References Cited

U.S. PATENT DOCUMENTS

| | | | | |
|---|---|---|---|---|
| 5,131,271 | A | * | 7/1992 | Haynes ............... G01F 23/2962 181/124 |
| 5,493,922 | A | | 2/1996 | Ramey et al. |
| 5,644,299 | A | * | 7/1997 | Cruickshank ....... G01F 23/2961 324/76.49 |
| 5,689,265 | A | * | 11/1997 | Otto ..................... G01F 23/284 340/612 |
| 2008/0053216 | A1 | | 3/2008 | Li et al. |
| 2010/0077853 | A1 | * | 4/2010 | Elsenhans ............. G01F 23/296 73/290 V |
| 2012/0045366 | A1 | * | 2/2012 | Katsumi ............ G01N 35/1011 422/67 |

OTHER PUBLICATIONS

PCT International Search Report and Written Opinion dated Nov. 4, 2014 (10 Pages).

* cited by examiner

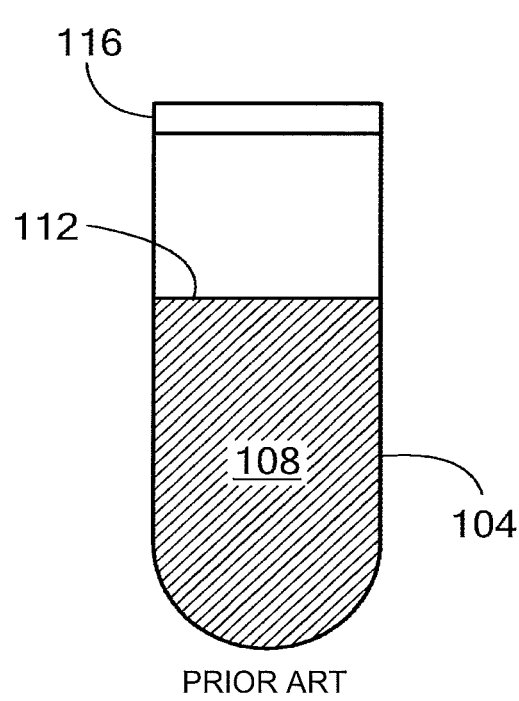
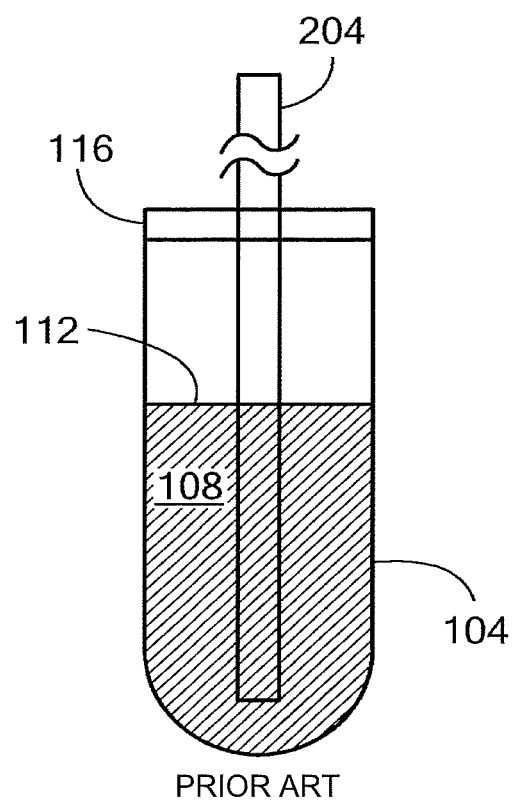
PRIOR ART
FIG. 1
PRIOR ART
FIG. 2

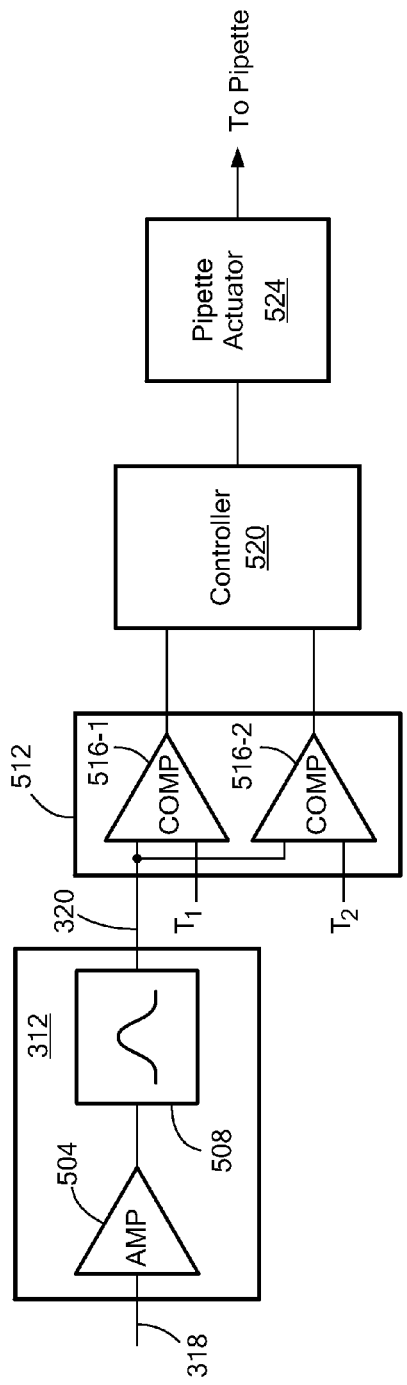
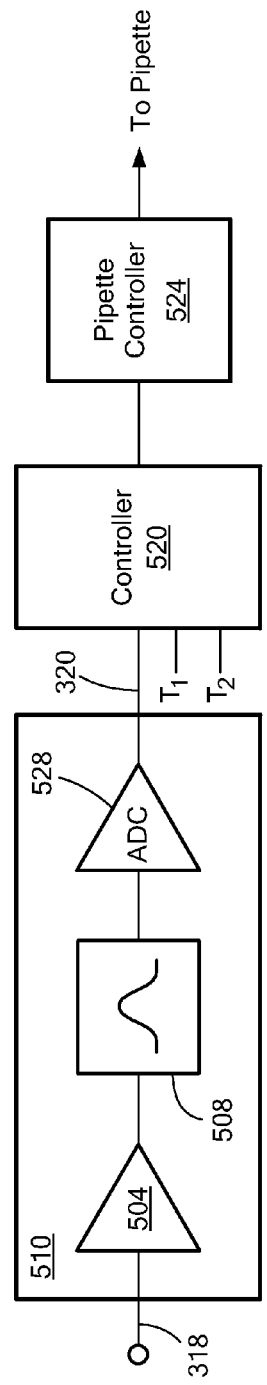
FIG. 5A
FIG. 5B

FLUID LEVEL DETECTION SYSTEM AND METHOD

CROSS REFERENCE TO RELATED APPLICATIONS

This application claims priority to U.S. Provisional Application Ser. No. 61/845,599, filed Jul. 12, 2013, which is incorporated herein by reference in its entirety.

BACKGROUND OF THE INVENTION

In conventional test systems, for example, known immunoassay analyzers, a container 104, as shown in FIG. 1, sometimes referred to as a cuvette, will include a liquid sample 108. The liquid sample 108 usually only partially fills the container 104 and, therefore, presents a sample surface 112. Generally, the container 104 is closed with a cover or septum 116 that may be made from either a flexible material, for example, rubber or a type of foil, for example, a metallic seal.

In operation, referring now to FIG. 2, a pipette 204 is inserted through the cover/septum 116 in order to retrieve a portion of the sample 108. In some known systems, the pipette 204 is driven down into the sample 108 a set distance that is expected to reach, for example, all the way to the bottom of the container 104. This, however, has the drawback of coating the pipette 204 with sample material that then needs to be washed away in order not to contaminate successive pipettings from other containers 104. In addition, by moving the pipette a set amount, the possibility of either aspirating an empty container 104 or driving the pipette through the container, is not reliably mitigated.

In known conventional capacitive level sense techniques for identifying that the pipette is in contact with the fluid sample, there is a reliance upon a very small energy transfer from a capacitive probe to the object being detected, i.e., the sample surface 112. This approach, however, has a high rate of false positives, i.e., a false determination that the pipette 204 has reached the sample surface 112, as the technique responds to input from any surface on which the signal is present. Specifically, the conventional capacitive level sense systems do not work reliably with a container 104 having a septum or a foil seal closure.

What is needed, therefore, is a level detection system that accurately determines the location of the sample surface 112 in a container 104 having a septum or a foil seal closure.

BRIEF SUMMARY OF THE INVENTION

In one embodiment of the present invention, the level sense system more specifically identifies the fluid sample surface by energizing the sample and container with a signal at a specific frequency. A level sense circuit is provided that uses an amplifier and a bandpass filter tuned to the energizing frequency to distinguish the surface of the fluid sample from other portions of the container. As a result, only contact with energized sample fluid material will result in a response from the level sense circuit.

In another embodiment, a surface detection method couples an input signal to either a probe or an outer surface of the container and detects an output signal from whichever of the two is not coupled to the input signal. A processed signal is generated as a function of the output signal and compared to a contact threshold level and when the processed signal is at least equal to the contact threshold is an indication that the probe has contacted the sample surface.

In yet another embodiment, a probe positioning apparatus to place a probe within a sample in a covered container includes a signal source configured to couple a first signal at a first frequency $f_p$ to either an outer surface of the container or the sample. A detector is coupled to whichever of the two is not coupled to the signal source in order to detect a second signal as a function of the first signal. A level detector is coupled to the detector and is configured to generate a third signal as a function of the second signal and a comparator, coupled to the level detector, is configured to compare the third signal to a contact threshold value.

BRIEF DESCRIPTION OF THE SEVERAL VIEWS OF THE DRAWINGS

Embodiments of the present invention may be better understood by referring to the following description in conjunction with the accompanying drawings in which:

FIG. 1 is a conventional container holding a sample;

FIG. 2 is a representation of the conventional container of FIG. 1 with a pipette inserted therein;

FIGS. 5A and 5B are embodiments of the present invention;

DETAILED DESCRIPTION OF THE INVENTION

The U.S. Provisional patent application Ser. No. 61/845,599 entitled "Fluid Level Detection System And Method," filed Jul. 12, 2013, is herein incorporated by reference for all purposes.

In the following detailed description, numerous specific details are set forth in order to provide a thorough understanding of the various embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Figure 3A:
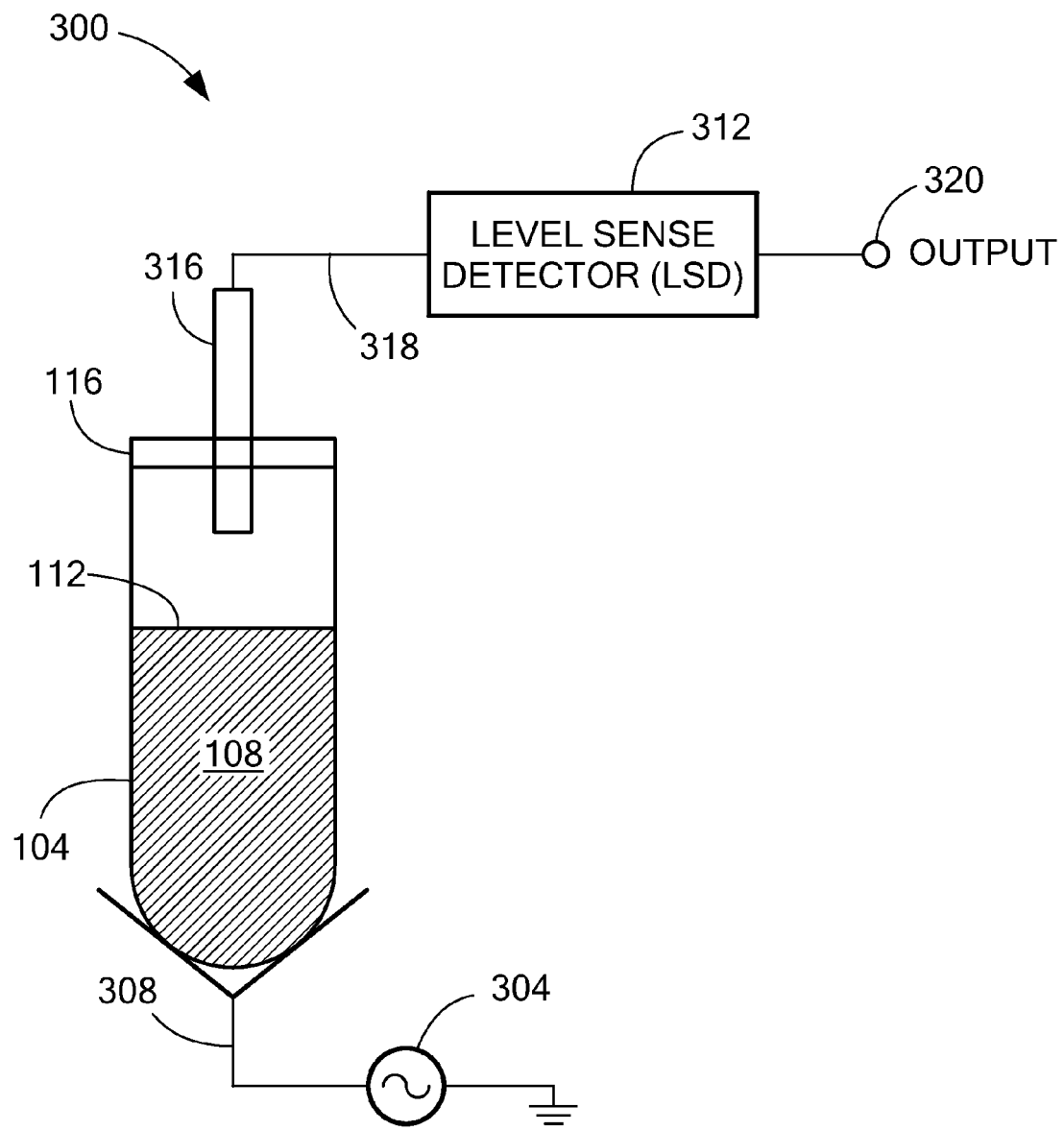
FIGS. 3A and 3B are block diagrams of an embodiment of the present invention.
Figure 3B:
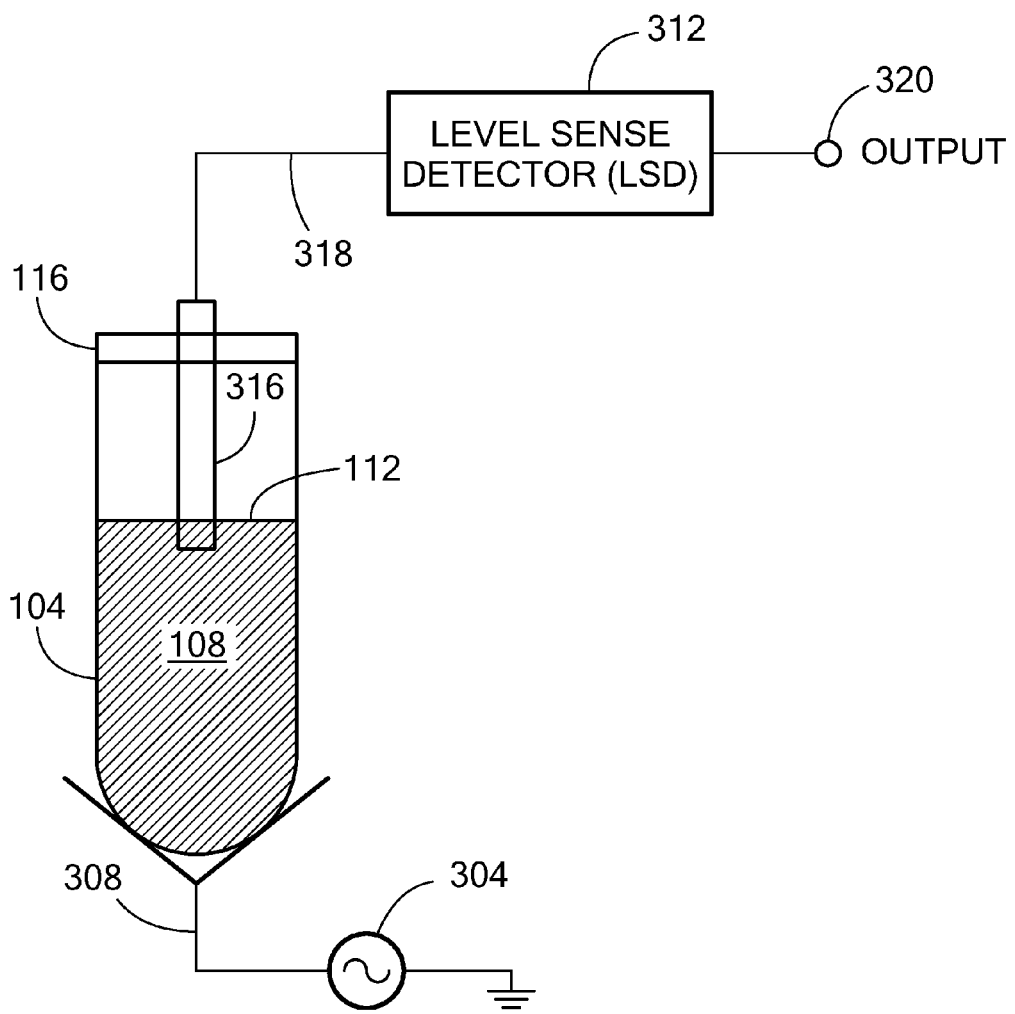

Referring now to FIGS. 3A and 3B, a level detection system 300 includes an AC signal source 304 coupled to the container 104 via an AC output coupler 308. The AC signal source 304 outputs a signal with a predetermined amplitude and predetermined frequency ($f_p$) that is coupled through the container 104 to the fluid sample 108 and the cover/septum 116. In one embodiment, the output signal is an RF signal with an amplitude of 100 mV-1 V (peak-to-peak) with the predetermined frequency ($f_p$) in the range of 100-450 KHz, and, in one embodiment, 250 KHz, generally in order to avoid FCC interference. A pipette/sensor 316 is inserted into the container 104 through the cover/septum 116 and is configured to provide a raw output signal 318 representing the signal detected from the AC signal source 304. A level sense detector (LSD) 312 is coupled to the pipette/sensor 316 to receive the raw output signal 318.

Typically, the fluid sample 108 in the container 104 will exhibit a requisite level of conductivity. In one embodiment, the fluid sample 108 may be an ionic fluid and the container 104 may be made of a material that can carry an RF signal such as, for example, glass, styrene, polypropylene and polyethylene. In this configuration, the cover/septum 116 does not have the same signal level induced upon it as the signal level that is induced upon the fluid sample 108 and, therefore, available at the surface 112 of the fluid sample 108. As a result, and as will be explained below, the system will distinguish when the pipette/sensor 316 touches the cover 116 from when the pipette/sensor 316 contacts the fluid sample 108.

Figure 4:
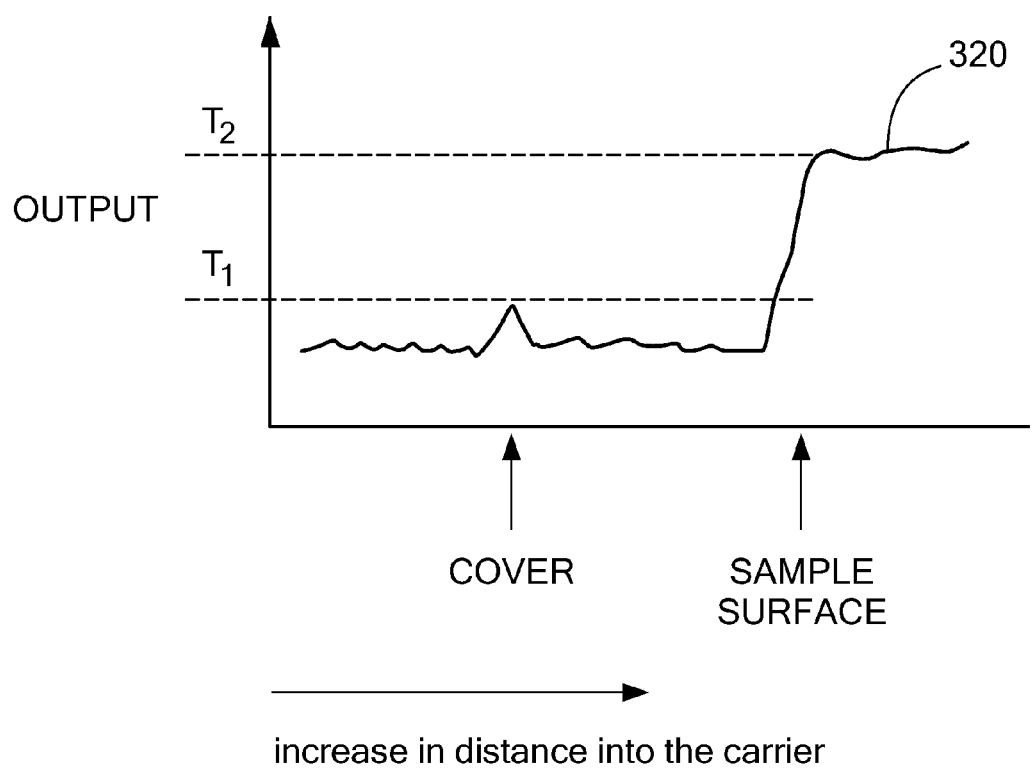
FIG. 4 is a graph of an output signal in accordance with one embodiment of the present invention.

Referring now to FIG. 3B, the LSD 312 receives the raw output signal 318 and processes this signal, as described below, to provide an output signal 320. As shown in FIG. 4, when the pipette/sensor 316 is urged into the container 104, or the container is urged onto the pipette, the output signal 320 will indicate an increase in signal amplitude to a first threshold level $T_1$ upon its touching, or penetrating through, the cover/septum 116. This first threshold level, however, will not be as high as a second, or "contact," threshold level $T_2$ that will be detected upon the arrival of the pipette/sensor 316 at the surface 112 of the fluid sample 108, as shown. Thus, the system can differentiate between the pipette/sensor 316 arriving at, or penetrating, the cover/septum 116 and the pipette/sensor 316 arriving at, i.e., contacting, the surface level 112 of the fluid sample 108 in the container 104.

Advantageously, once the surface level 112 of the fluid sample 108 is detected, the system can minimize the insertion depth of the pipette/sensor 316 into the fluid sample 108 and, therefore, minimize the amount of cleanup of the pipette that will be necessary. In addition, a system may be preprogrammed to insert the pipette a predetermined distance beyond the detection of the surface 112 of the sample 108 in the container 104 in the event that the lumen of the pipette is either set back from the sensing portion of the pipette/sensor 316 and/or to assure that there is complete insertion of an opening to the lumen of the pipette to assure that air is not aspirated into the system. Further, the system may halt further movement of the pipette/sensor 316 into the container 104 if a distance the pipette has moved since the detection of the cover is greater than some predetermined safety distance. This would prevent aspiration of either an empty container or one with too little sample volume and also prevent the pipette from being driven into, and possibly through, the bottom of the container.

Referring now to FIG. 5A, in one embodiment of the present invention, the level sense detector 312 includes an analog amplifier 504 to receive the signal 318 detected by the pipette/sensor 316. An output of the amplified signal is provided to a bandpass filter 508 that is centered, ±5%, about the predetermined frequency $f_p$ provided by the AC signal source 304 to provide the output signal 320. The amplifier 504, in one embodiment, is a high gain amplifier and therefore the implementation of the bandpass filter 508 allows for improved sensitivity while, at the same time, reducing a false detection of the surface 112 of the fluid sample 108 due to unwanted and extraneous signals.

The output signal 320 is provided as an input to a comparator circuit 512 including two comparators 516-1, 516-2 that are set, respectively, to determine if the amplitude of the output signal 320 has passed either of the first $T_1$ or second $T_2$ threshold values described above. The outputs of the comparators 516-1, 516-2 are provided to a controller 520 for determining the location of the pipette. The controller 520 processes the information and controls a pipette actuator 524, for example, a stepper motor or the like, for moving the pipette.

In another embodiment, as shown in FIG. 5B, the output of the bandpass filter 508 is provided to an analog-to-digital converter (ADC) 528 and the output of the ADC 528 is provided to the controller 520 in order to identify the surface 112 of the fluid sample 108 by comparison to the first $T_1$ or second $T_2$ threshold values. One of ordinary skill in the art will understand that the controller could be any type of processor capable of receiving the first $T_1$ or second $T_2$ threshold values as either analog levels or digital signals. Further, a hybrid approach of analog and digital components may also be implemented and embodiments of the present invention are not limited to one or the other and are presented here merely for explanatory purposes. Of course, the function of the comparator device 512 may be incorporated into a device that includes the controller 520 as would be understood by one of ordinary skill in the art.

Figure 6:
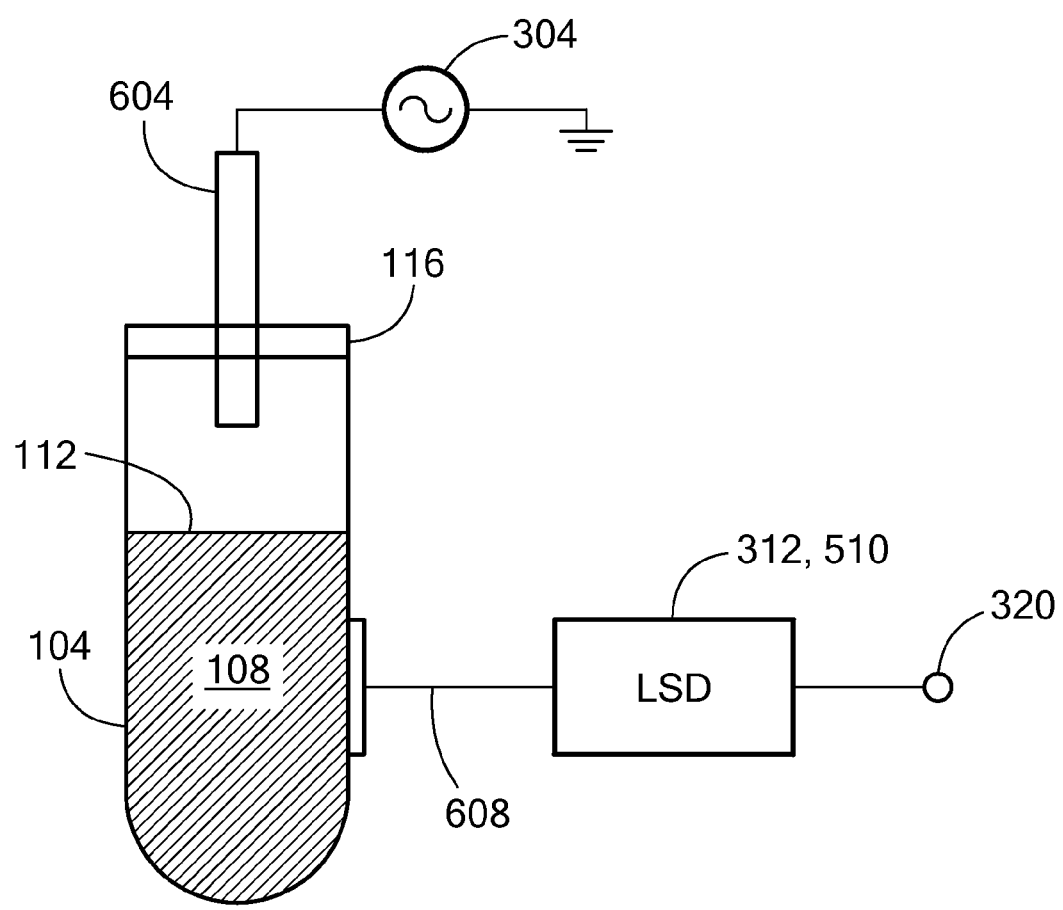
FIG. 6 is a block diagram of another embodiment of the present invention.

In another embodiment of a level detection system, referring now to FIG. 6, the AC signal source 304 may be coupled to a pipette/transmitter 604 and the level sense detector 312 is coupled via an AC input coupler 608 to the container 104. As the pipette/transmitter 604 is lowered into the container 104, a lower amplitude signal will be detected to the level sense detector 312. Upon arrival of the pipette/transmitter 604 at the surface 112 of the fluid sample 108 108, however, the level sense detector 312 will detect a higher amplitude signal and determine, therefore, that the pipette/transmitter 604 has arrived at the surface 112 and the system will respond accordingly.

Figure 7A:
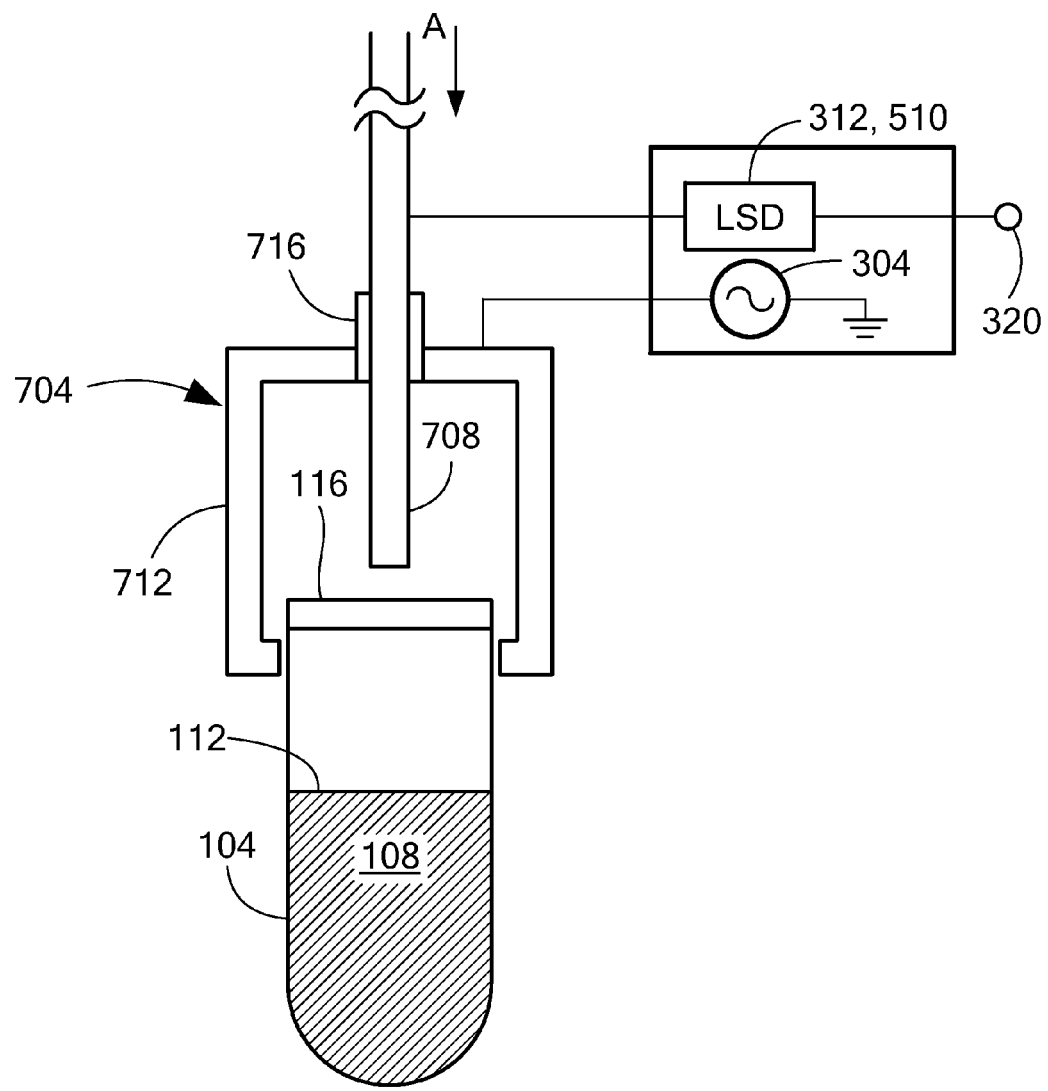
FIGS. 7A and 7B are block diagrams of yet another embodiment of the present invention.
Figure 7B:
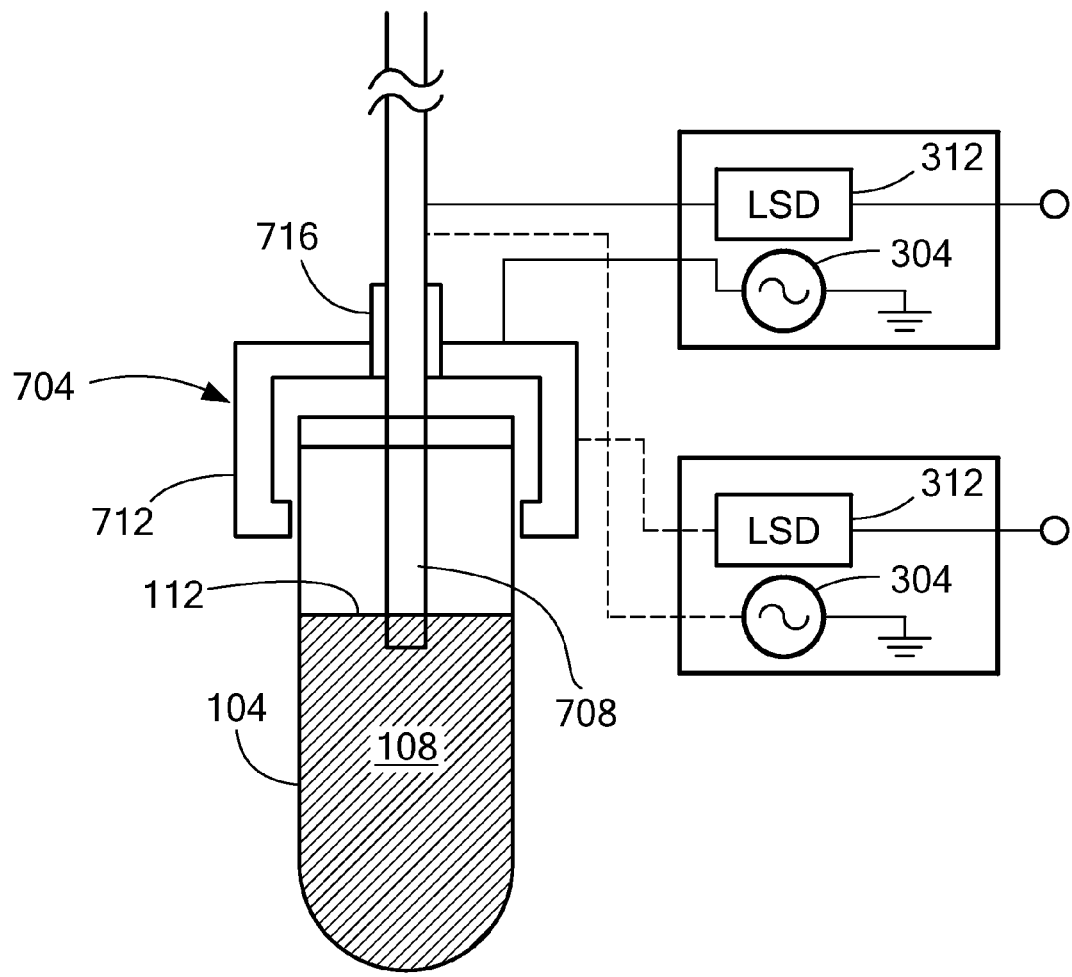

In yet another embodiment of the present invention, referring now to FIGS. 7A and 7B, a combination assembly 704 includes a pipette/transceiver 708 inserted through an AC coupler 712 where the pipette/transceiver 708 and the AC coupler 712 are isolated from one another by a seal 716. In one version, the pipette/transceiver 708 is connected to the level sense detector 312 and the AC coupler 712 is connected to the AC signal source 304. Alternatively, and as shown in FIG. 7B, the level sense detector 312 is coupled to the AC coupler 712 and the AC signal source 304 is coupled to the pipette/transceiver 708. It should be noted that the combination assembly 704 is not shown to scale and one of ordinary skill in the art would understand the relative sizes and geometries necessary to provide a proper configuration for any container 104 on which the assembly 704 would be applied. Operation of either of these embodiments is along the lines as described for the embodiments above.

Figure 8:
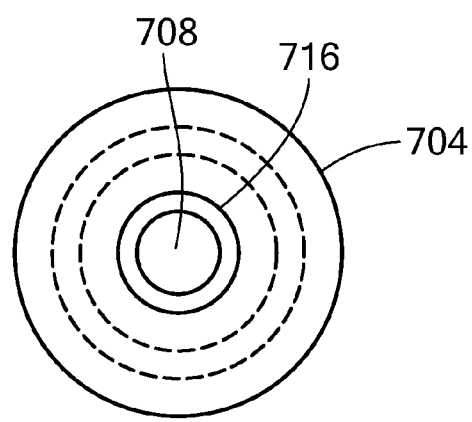
FIG. 8 is a top view of a combination assembly in accordance with an embodiment of the present invention.

Referring now to FIG. 8, a top view of the combination assembly, from the direction A as shown in FIG. 7A, the combination assembly 704 is, generally, circular as is the pipette/transceiver 708 and the seal 716. Of course, the geometry of the combination assembly would be adapted to correspond to the geometry of the container.

In the foregoing embodiments, the pipette/sensor 316 or pipette/transceiver 708 was described as being lowered into the container 104. Of course, one of ordinary skill in the art would understand that the pipette/sensor 316 or pipette/transceiver 708 may be held stationary while the carrier/cuvette 104 is pushed up onto the pipette/sensor 316 or pipette/transceiver 708 until the level 112 of the fluid sample 108 has been detected. Further, the sensor may be separate from the pipette and offset some predetermined distance such that the sensor touches the septum and fluid prior to the pipette.

In addition, embodiments of the present invention may operate in a system where the container does not include a cover. Thus, the determination of the pipette reaching the fluid would be based on the signal meeting or exceeding the second threshold value $T_2$ without there having been a crossing of the septum and the corresponding signal response.

Having thus described several features of at least one embodiment of the present invention, it is to be appreciated that various alterations, modifications and improvements will readily occur to those skilled in the art. Such alterations, modifications and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of detecting whether a surface of a sample in a container having a cover is within a safety distance of the cover, the method comprising:
   coupling an alternating current (AC) input signal to one of a probe and an outer surface of the container;
   moving at least one of the container and the probe relative to one another such that the probe is directed into the container;
   detecting an AC output signal from the other of the probe and the outer surface of the container that is not coupled to the input signal;
   generating a processed AC signal as a function of the detected AC output signal;
   comparing the amplitude of the processed AC signal to a contact threshold level;
   determining that the probe has contacted the sample surface when the amplitude of the processed AC signal is at least equal to the contact threshold level;
   comparing the amplitude of the processed AC signal to a first threshold level less than the contact threshold level and determining a time when the amplitude of the processed AC signal is greater than or equal to the first threshold level, indicative of contact between the probe and the container cover;
   measuring a distance the container and the probe have moved relative to each other since the determined time when the amplitude of the processed AC signal was greater than or equal to the first threshold level;
   comparing the measured distance to a safety distance; and,
   if the measured distance exceeds the safety distance and the amplitude of the processed AC signal has not been determined to be at least equal to the contact threshold level, then ceasing movement of the container and the probe relative to one another,
   wherein the AC input signal has a predetermined contact frequency $f_p$, and
   wherein generating the processed AC signal comprises amplifying and filtering in frequency the detected AC output signal.

2. The method as recited in claim 1, wherein generating the processed AC signal as a function of the detected AC output signal comprises:
   bandpass filtering the amplified AC output signal relative to the contact frequency $f_p$.

3. A method of detecting a location of a probe with respect to a cover of a container having a sample therein, the method comprising:
   applying an alternating current (AC) input signal with a contact frequency $f_p$ to an outer surface of the container;
   detecting an AC output signal from a probe inserted in the container;
   generating a processed AC signal as a function of the detected AC output signal;
   comparing the amplitude of the processed AC signal to a contact threshold value;
   identifying the location of the sample surface when the processed AC signal is greater than or equal to the contact threshold value;
   comparing the amplitude of the processed AC signal to a first threshold value that is less than the contact threshold value; and
   if the amplitude of the processed AC signal is determined to be equal to or greater than the first threshold value but less than the contact threshold value, then determining that the probe has touched the cover of the container,
   wherein generating the processed AC signal comprises amplifying and filtering in frequency the detected AC output signal.

4. The method as recited in claim 3, wherein generating the processed AC signal comprises:
   bandpass filtering the AC output signal relative to the contact frequency $f_p$ to provide a filtered AC signal as the processed AC signal.

5. The method as recited in claim 3, wherein the contact frequency $f_p$ is in a range of 230-270 KHz.

6. A method of positioning a probe with respect to a cover of a container having a sample therein, the method comprising:
   applying a first alternating current (AC) signal with a first frequency $f_p$ to an outer surface of the container;
   moving the probe in a first direction into the container through the cover;
   detecting a second AC signal from the probe;
   generating a third AC signal as a function of the second AC signal;
   comparing an amplitude of the third AC signal to first and second threshold values where the first threshold value is less than the second threshold value;
   detecting when the amplitude of the third AC signal is equal to or greater than the first threshold value;
   detecting when the amplitude of the third AC signal is at least equal to the second threshold value;
   moving the probe a predetermined distance in the first direction after first detecting that the amplitude of the third AC signal is at least equal to the first threshold value; and
   determining the probe has contacted the sample when the amplitude of the third AC signal is at least equal to the second threshold value,
   wherein generating the third AC signal as a function of the second AC signal comprises amplifying and filtering in frequency the second AC signal.

7. The method as recited in claim 6, wherein generating the third AC signal as a function of the second AC signal comprises:
   bandpass filtering the second AC signal with respect to the first frequency $f_p$.

8. The method as recited in claim 6, further comprising:
   determining a first distance the probe has been moved since the amplitude of the third AC signal was detected to be equal to or greater than the first threshold value.

9. The method as recited in claim 8, further comprising:
   comparing the first distance to a predetermined safety distance; and stopping movement of the probe if the first distance is greater than the predetermined safety distance and the amplitude of the third AC signal is less than the second threshold value.

10. The method as recited in claim 6, wherein generating the third AC signal as a function of the second AC signal comprises:

bandpass filtering the second AC signal with respect to the first frequency $f_p$; and converting the third AC signal to a digital signal.

* * * * *